(12) United States Patent
Krishnaswamy et al.

(10) Patent No.: US 11,762,842 B2
(45) Date of Patent: Sep. 19, 2023

(54) SYSTEMS AND METHODS FOR ASYNCHRONOUS DELAYED UPDATES IN VIRTUAL DISTRIBUTED LEDGER NETWORKS

(71) Applicant: Reliance Jio Infocomm Limited, Ahmedabad (IN)

(72) Inventors: Dilip Krishnaswamy, Bangalore (IN); Aayush Bhatnagar, Navi Mumbai (IN); Kanchan Chauhan, Navi Mumbai (IN); Dipender Bhamrah, Mumbai (IN)

(73) Assignee: Jio Platforms Limited, Gujarat (IN)

( * ) Notice: Subject to any disclaimer, the term of this patent is extended or adjusted under 35 U.S.C. 154(b) by 429 days.

(21) Appl. No.: 16/927,495

(22) Filed: Jul. 13, 2020

(65) Prior Publication Data
US 2020/0341971 A1     Oct. 29, 2020

Related U.S. Application Data

(63) Continuation-in-part of application No. 16/821,529, filed on Mar. 17, 2020.

(30) Foreign Application Priority Data

Mar. 18, 2019   (IN) .............................. 201921010499

(51) Int. Cl.
   *G06F 16/23*   (2019.01)
   *G06F 9/455*   (2018.01)
   *G06F 16/27*   (2019.01)

(52) U.S. Cl.
   CPC ...... *G06F 16/2379* (2019.01); *G06F 9/45558* (2013.01); *G06F 16/273* (2019.01); *G06F 2009/45562* (2013.01)

(58) Field of Classification Search
   CPC ............. G06F 16/2379; G06F 9/45558; G06F 16/273; G06F 2009/45562; G06F 16/176
   See application file for complete search history.

(56) References Cited

U.S. PATENT DOCUMENTS

2018/0189100 A1 *   7/2018   Nemoto .................. G06F 9/542
2019/0229918 A1 *   7/2019   Naqvi ................... H04L 9/3239
(Continued)

FOREIGN PATENT DOCUMENTS

WO   WO-2019126311 A1 *   6/2019   ........... G06Q 20/065

*Primary Examiner* — Bruce S Ashley
(74) *Attorney, Agent, or Firm* — Finnegan, Henderson, Farabow, Garrett & Dunner, LLP

(57) ABSTRACT

The present disclosure relates to systems and methods for asynchronous delayed updates in virtual distributed ledger networks. In one embodiment, a processor-implemented method is disclosed, comprising receiving, at a first virtual machine or container associated with a master ledger, a transaction request comprising transaction information; updating the master ledger with the transaction information; communicating, by the first virtual machine or container, with one or more additional virtual machines or containers each associated with a slave ledger an update from the master ledger to the slave ledgers at one or more times determined based on a delay tolerance associated with each of the one or more additional virtual machines or containers; and updating the one or more additional virtual machines or containers based on the communicated update of the master ledger.

17 Claims, 11 Drawing Sheets

(56) References Cited

U.S. PATENT DOCUMENTS

2019/0354614 A1\* 11/2019 Chui .................. H04L 9/3239
2020/0174912 A1\* 6/2020 Sanghvi ............. G06F 11/3688

\* cited by examiner

SYSTEMS AND METHODS FOR ASYNCHRONOUS DELAYED UPDATES IN VIRTUAL DISTRIBUTED LEDGER NETWORKS

PRIORITY CLAIM

This application is a continuation-in-part application of U.S. patent application Ser. No. 16/821,529, titled "SYSTEMS AND METHODS FOR VIRTUAL DISTRIBUTED LEDGER NETWORKS," filed on Mar. 17, 2020, which in turn claims the benefit of Indian provisional application no. 201921010499, filed on Mar. 18, 2019. The entire contents of the aforementioned applications are incorporated herein by reference.

TECHNICAL FIELD

The present disclosure relates generally to wireless/wireline networks, and more particularly, to methods and systems for virtual distributed ledger networks (DLN) provisioning using distributed ledger technology (DLT) or blockchain technology.

BACKGROUND

A blockchain network of nodes may use a specific type of blockchain technology such as a permissioned/private network based on Hyperledger Fabric or a public blockchain network, e.g., Ethereum. However, such a system does not have the flexibility to adapt to the needs of a specific use-case which might need a certain type of blockchain or distributed ledger technology. Today there are no systems or methods that support a dynamically configurable blockchain platform which can allow different types of distributed ledger technology (DLT)-based networks to be created as needed, utilizing microservices to compose the needs of each specific DLT, and to enable different DLTs created by the platform to interact with each other.

Accordingly, there is a need for virtual DLT (vDLT) nodes that can be created to participate in multiple DLT/blockchain networks, can leverage a microservices-based architecture to provide capabilities that are needed to participate in these one or more DLT/blockchain networks, and can interoperate across these blockchain networks such as permissioned private DLT/blockchain network or a public DLT/blockchain network.

SUMMARY

Embodiments of the present disclosure may present technological solutions to one or more of the above-mentioned technical problems in conventional systems. For example, in one embodiment, a method for implementing a virtual distributed ledger network is provided. Said method may include: receiving, via a network, a transaction request associated with at least one transaction; recording, by the virtual distributed ledger, the at least one transaction; computing a hash based on the at least one transaction; chaining the hash for the at least one transaction; generating a transaction update request based on the chained hash of the at least one transaction; and transmitting the transaction update request to a data storage unit connected to one or more computing nodes.

In another embodiment, a system for implementing a virtual distributed ledger network is provided. Said system may include one or more data storage units configured to store at least one transaction request and one or more computing nodes connected to each other and to the one or more data storage units, wherein each of the one or more computing nodes includes a local data storage unit and one or more microservices, and wherein each computing node is configured to perform operations. The operations may include: receiving, via a network, a transaction request associated with at least one transaction; recording, by the virtual distributed ledger, the at least one transaction; computing a hash based on the at least one transaction; chaining the hash for the at least one transaction; generating a transaction update request based on the chained hash of the at least one transaction; and transmitting the transaction update request to a data storage unit connected to one or more computing nodes.

In yet another embodiment, one or more non-transitory machine readable information storage mediums for technology recommendations are provided. Said one or more non-transitory machine readable information storage mediums includes one or more instructions which when executed by one or more hardware processors cause receiving, via a network, a transaction request associated with at least one transaction; recording, by a virtual distributed ledger, the at least one transaction; computing a hash based on the at least one transaction; chaining the hash for the at least one transaction; generating a transaction update request based on the chained hash of the at least one transaction; and transmitting the transaction update request to a data storage unit connected to one or more computing nodes.

In another embodiment, a system for implementing virtual distributed ledger technology network nodes is disclosed, comprising a hardware processor and a memory device storing instructions executable by the hardware processor to perform operations. The operations comprise creating one or more virtual machines, and executing a plurality of microservices via the one or more virtual machines. At least two of the plurality of microservices are associated with different distributed ledger technology networks. The plurality of microservices include an event routing manager microservice configured to receive a smart contract microservice request and to route events between microservices, a smart contract execution microservice configured to execute a smart contract associated with the smart contract microservice request, and a transaction resource manager microservice configured to commit an outcome of the smart contract execution microservice to a distributed ledger associated with one of the different distributed ledger technology networks.

In another embodiment, a method for implementing virtual distributed ledger technology network nodes is disclosed. The method comprises creating, via at least one hardware processor, one or more virtual machines, and executing, via the at least one hardware processor, a plurality of microservices via the one or more virtual machines. At least two of the plurality of microservices are associated with different distributed ledger technology networks. The plurality of microservices include an event routing manager microservice configured to receive a smart contract microservice request and to route events between microservices, a smart contract execution microservice configured to execute a smart contract associated with smart contract microservice request, and a transaction resource manager microservice configured to commit an outcome of the smart contract execution microservice to a distributed ledger associated with one of the different distributed ledger technology networks.

In another embodiment, a non-transitory computer-readable medium storing instructions for implementing virtual distributed ledger technology network nodes, the instructions executable by a hardware processor to perform operations. The operations comprise creating, via at least one hardware processor, one or more virtual machines, and executing, via the at least one hardware processor, a plurality of microservices via the one or more virtual machines. At least two of the plurality of microservices are associated with different distributed ledger technology networks. The plurality of microservices include an event routing manager microservice configured to receive a smart contract microservice request and to route events between microservices, a smart contract execution microservice configured to execute a smart contract associated with smart contract microservice request, and a transaction resource manager microservice configured to commit an outcome of the smart contract execution microservice to a distributed ledger associated with one of the different distributed ledger technology networks.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Blockchain technology uses on tools from cryptology and data security, for example, in terms of message authentication targeted towards tamper-evidence and tamper-resilience. A blockchain may be described as a tamper-evident ledger shared within a network of entities, where the ledger holds a record of transactions of assets between the entities. To achieve tamper-evidence in the ledger, blockchain exploits cryptographic hash functions to crypt the data.

Figure 1:
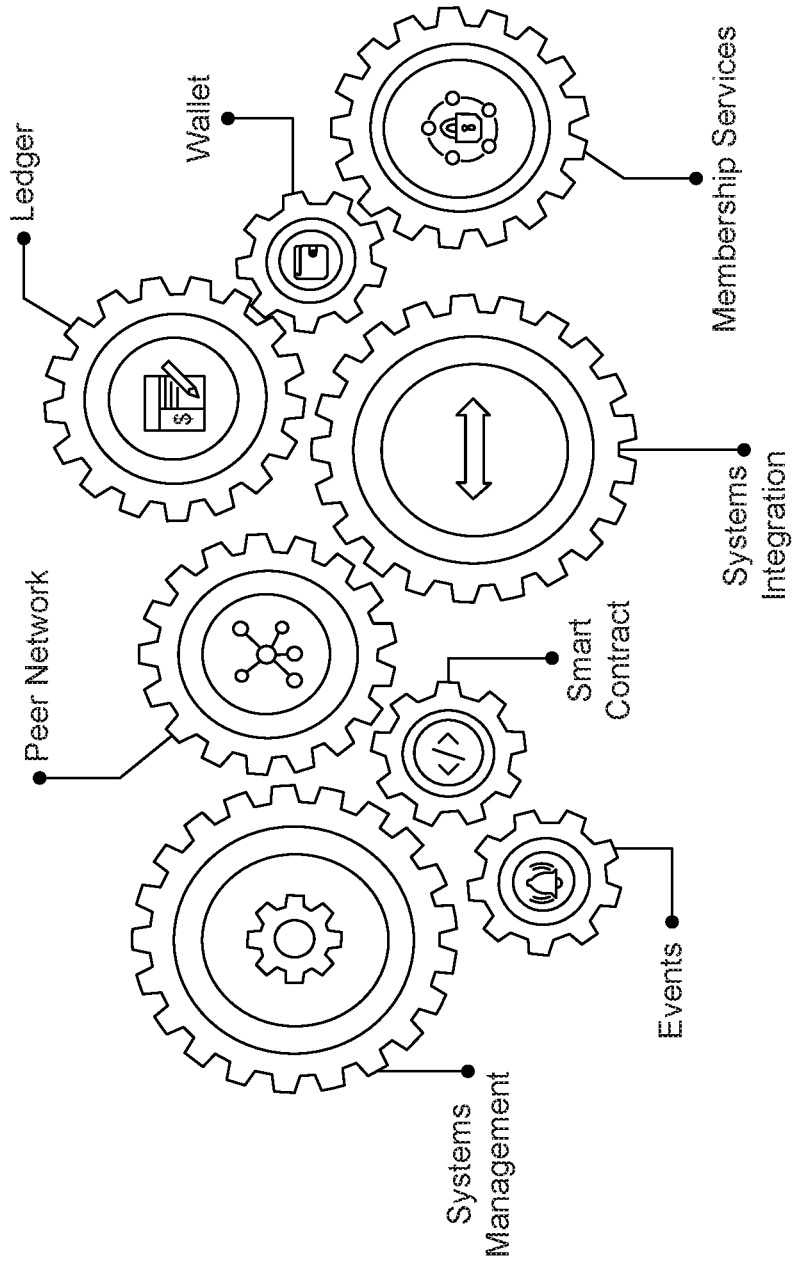
FIG. 1 illustrates an exemplary set of blockchain components according to some embodiments of the present disclosure.

FIG. 1 is an illustration of exemplary blockchain functionality, consistent with disclosed embodiments. For example, a blockchain may be built of several different types of components as listed below and shown in FIG. 1, each with a role to play within the blockchain's operation. These components may include:

Ledger: A distributed, immutable historical record.
Peer Network: Stores, updates, and maintains the ledger.
Membership Services: User authentication, authorization, and identity management.
Smart Contract: Program that runs on the blockchain.
Wallet: Stores users' credentials.
Events: Notifications of updates and actions on the blockchain.
Systems Management: Component creation, modification, and monitoring.
Systems Integration: Integration of blockchain with external systems.

In some embodiments, a blockchain may include a ledger. For example, a blockchain may create and use a distributed, immutable record of the history of the blockchain called the ledger.

A distributed ledger is a ledger that is replicated in whole or in part to multiple computers. A cryptographic distributed ledger (CDL) can have one or more of these properties: irreversibility (once a transaction is recorded, it cannot be reversed), accessibility (any party can access the CDL in whole or in part), chronological and time-stamped (all parties know when a transaction was added to the ledger), consensus based (a transaction is added only if it is approved, typically unanimously, by parties on the network), verifiability (all transactions can be cryptographically verified). A blockchain is an example of a CDL.

In some embodiments, the blockchain may include a peer network that stores, updates, and maintains the ledger. Each node in this network may maintain its own copy of the ledger. It is the job of the network to come to a consensus on the contents of each update to the ledger. This may ensure that each individual copy of the ledger is identical without requiring a centralized "official" copy of the ledger.

Another function of a blockchain may be membership services, such as, user authentication, authorization, and identity management. In some blockchains, anyone can join the peer network and all network members have equal powers and authority. Permissioned blockchains may require authorization to join, where the authorization may be managed by membership services.

An additional function of a blockchain may be to implement smart contract programs that run on the blockchain. Originally, blockchains were designed to allow financial transactions to be performed and stored in the historical ledger and had limited configurability. However, blockchains have evolved such that a blockchain may include fully functional distributed computers. Smart contracts are programs that run on the blockchain where users can interact with smart contracts in a similar way that they interact with programs on a standard computer.

In some embodiments, a blockchain may include a wallet for storing user credentials. In blockchain, a user's wallet may store his credentials and track digital assets associated with the user's address. The wallet may track user credentials and any other information that may be associated with their account.

In another embodiment, a blockchain may include events or notifications of updates and actions on the blockchain. The blockchain's ledger and the state of the peer network may be updated by events. Examples of events include the creation and dispersion of a new transaction across the peer network or the addition of a new block to the blockchain. Events may also include notifications from smart contracts on blockchains that support such contracts.

A blockchain may also be configured to act as systems management. For example, the blockchain may be configured to create, modify, or monitor system components. The blockchain may be designed to be a long-lived system in a field that is constantly evolving. Systems management may provide the capability of creating, modifying, and monitoring blockchain components to meet the needs of its users.

Further, in some embodiments, the blockchain may integrate with external systems. As blockchain has evolved and increased in functionality, it has become more common to integrate blockchains with other external systems, such as systems using smart contracts.

A distributed ledger may be a continuously growing list of records that typically apply cryptographic techniques such as storing cryptographic hashes relating to other blocks. A blockchain is one example of a distributed ledger and may be used as a public ledger to store information. A blockchain can store various information related to goods and services (i.e., products, packages, status, etc.). A decentralized scheme may provide authority and trust to a decentralized network and enables its nodes to continuously and sequentially record their transactions on a public "block", creating a unique "chain" referred to as a blockchain. Cryptography, via hash codes, may be used to secure an authentication of a transaction source and removes a central intermediary.

A blockchain may be a distributed database that maintains a continuously-growing list of records in the blockchain blocks, which are secured from tampering and revision due to their immutable properties. Each block may contain a timestamp and a link to a previous block. A blockchain can be used to hold, track, transfer and verify information. Since a blockchain is a distributed system, before adding a transaction to the blockchain ledger, all peers may need to reach a consensus status.

A blockchain is a distributed system which may include multiple nodes that communicate with each other. In some embodiments, a blockchain operates programs called chaincode (e.g., smart contracts, etc.), holds state and ledger data, and executes transactions. Some transactions are operations invoked on the chaincode. In general, blockchain transactions typically must be "endorsed" by certain blockchain members and only endorsed transactions may be committed to the blockchain and influence the state of the blockchain. Other transactions which are not endorsed may be disregarded. There may exist one or more special chaincodes for management functions and parameters, collectively called system chaincodes.

Nodes are the communication entities of the blockchain system. A "node" may perform a logical function in the sense that multiple nodes of different types can run on the same physical server. Nodes may be grouped in trust domains and may be associated with logical entities that control them in various ways. Nodes may include different types, such as a client or submitting-client node which submits a transaction-invocation to an endorser (e.g., peer), and broadcasts transaction-proposals to an ordering service (e.g., ordering node). Another type of node is a peer node which can receive client submitted transactions, commit the transactions and maintain a state and a copy of the ledger of blockchain transactions. An ordering-service-node or orderer is a node running the communication service for all nodes, and which implements a delivery guarantee, such as a broadcast to each of the peer nodes in the system when committing transactions and modifying a world state of the blockchain, which is another name for the initial blockchain transaction which normally includes control and setup information.

A ledger may be a sequenced, tamper-resistant record of all state transitions of a blockchain. State transitions may result from chaincode invocations (i.e., transactions) submitted by participating parties (e.g., client nodes, ordering nodes, endorser nodes, peer nodes, etc.). A transaction may result in a set of asset key-value pairs being committed to the ledger as one or more operands, such as creates, updates, deletes, and the like. The ledger may include a blockchain (also referred to as a chain) which is used to store an immutable, sequenced record in blocks. The ledger may also include a state database which maintains a current state of the blockchain. In some embodiments, there is one ledger per channel. Each peer node maintains a copy of the ledger for each channel of which they are a member.

A chain may refer to a transaction log which is structured as hash-linked blocks, and each block contains a sequence of N transactions where N is equal to or greater than one. A block header may include a hash of the block's transactions, as well as a hash of the prior block's header. In this way, all transactions on the ledger may be sequenced and cryptographically linked together. Accordingly, it may not be possible to tamper with the ledger data without breaking the hash links. A hash of a most recently added blockchain block may represent every transaction on the chain that has come before it, making it possible to ensure that all peer nodes are in a consistent and trusted state. The chain may be stored on a peer node file system (i.e., local, attached storage, cloud, etc.), efficiently supporting the append-only nature of the blockchain workload.

The current state of the immutable ledger may represent the latest values for all keys that are included in the chain transaction log. Because the current state may represent the latest key values known to a channel, it is sometimes referred to as a world state. Chaincode invocations may execute transactions against the current state data of the ledger. To make these chaincode interactions efficient, the latest values of the keys may be stored in a state database. The state database may be simply an indexed view into the chain's transaction log, it can therefore be regenerated from the chain at any time. The state database may automatically be recovered (or generated if needed) upon peer node startup, and before transactions are accepted.

A business blockchain solution may require many actors playing a variety of roles to be fully functional. Blockchain technology may enable new solutions to solve complex problems of storage, processing, immutability, cryptography with consensus to provide solutions to various needs.

Microservices are variant of the service-oriented architecture (SOA) architectural style that structures an application as a collection of loosely coupled services. In a microservices architecture, services may be fine grained, and the protocols are lightweight. The benefit of decomposing an application into different smaller services is that it improves modularity. This may make the application easier to understand, develop, test, and become more resilient to architecture erosion. It parallelizes development by enabling small autonomous teams to develop, deploy and scale their respective services independently. It may also allow the architecture of an individual service to emerge through continuous refactoring. Microservices-based architectures may enable continuous delivery and deployment.

In disclosed embodiments, virtualization refers to the act of creating a virtual (rather than actual) version of something, including virtual computer hardware platforms, storage devices, and computer network resources. Hardware virtualization or platform virtualization refers to the creation of a virtual machine that acts like a real computer with an operating system. Software executed on these virtual machines may be separated from the underlying hardware resources. Operating-system-level virtualization, also known as containerization, refers to an operating system feature in which the kernel allows the existence of multiple isolated user-space instances.

The present disclosure presents a novel automatic method to optimally address the problems in supporting a dynamically configurable blockchain platform. Disclosed embodiments may allow different types of distributed ledger technology (DLT)-based networks to be created as needed, to use microservices to compose the needs of each specific DLT, and to enable different DLTs created by the platform to interact with each other. Also, the present disclosure may provide methods and systems for virtual distributed ledger technology (vDLT) nodes that can participate in multiple DLT/blockchain networks, leverage a microservices-based architecture to provide capabilities that are needed to participate in these one or more DLT/blockchain networks, and interoperate across these blockchain networks such as permissioned private DLT/blockchain network or a public DLT/blockchain network.

In the following description, for the purposes of explanation, specific details are set forth in order to provide a thorough understanding of embodiments of the present disclosure. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the present disclosure as set forth.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed but could have additional steps not included in a figure. A process may correspond to a method, a function, a procedure, a subroutine, a subprogram, etc. When a process corresponds to a function, its termination can correspond to a return of the function to the calling function or the main function.

The term "machine-readable storage medium" or "computer-readable storage medium" includes, but is not limited to, portable or non-portable storage devices, optical storage devices, and various other mediums capable of storing, containing, or carrying instruction(s) and/or data. A machine-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a machine-readable medium. A processor(s) may perform the necessary tasks.

Systems depicted in some of the figures may be provided in various configurations. In some embodiments, the systems may be configured as a distributed system where one or more components of the system are distributed across one or more networks in a cloud computing system.

A network may be set up to provide an access device user with access to various devices connected to the network. For example, a network may include one or more network devices that provide a user with the ability to remotely configure or control the network devices themselves or one or more electronic devices (e.g., appliances) connected to the network devices. The electronic devices may be located within an environment or a venue that can support the network. An environment can include, for example, a home, an office, a business, an automobile, a park, or the like. A network may include one or more gateways that allow client devices (e.g., network devices, access devices, or the like) to access the network by providing wired connections and/or wireless connections using radio frequency channels in one or more frequency bands. The one or more gateways may also provide the client devices with access to one or more external networks, such as a cloud network, the Internet, and/or other wide area networks.

In some embodiments, a user may create an account with login information that is used to authenticate the user and allow access to the network devices. For example, once an account is created, a user may enter the login information in order to access a network device in a logical network.

In some embodiments, an accountless authentication process may be performed so that the user can access one or more network devices within a logical network without having to enter network device login credentials each time access is requested. While located locally within the local area network, an access device may be authenticated based on the access device's authentication with the logical network. For example, if the access device has authorized access to the logical network (e.g., a Wi-Fi network provided by a gateway), the network devices paired with that logical network may allow the access device to connect to them without requiring a login. Accordingly, only users of access devices that have authorization to access the logical network are authorized to access network devices within the logical network, and these users are authorized without having to provide login credentials for the network devices.

Figure 2:
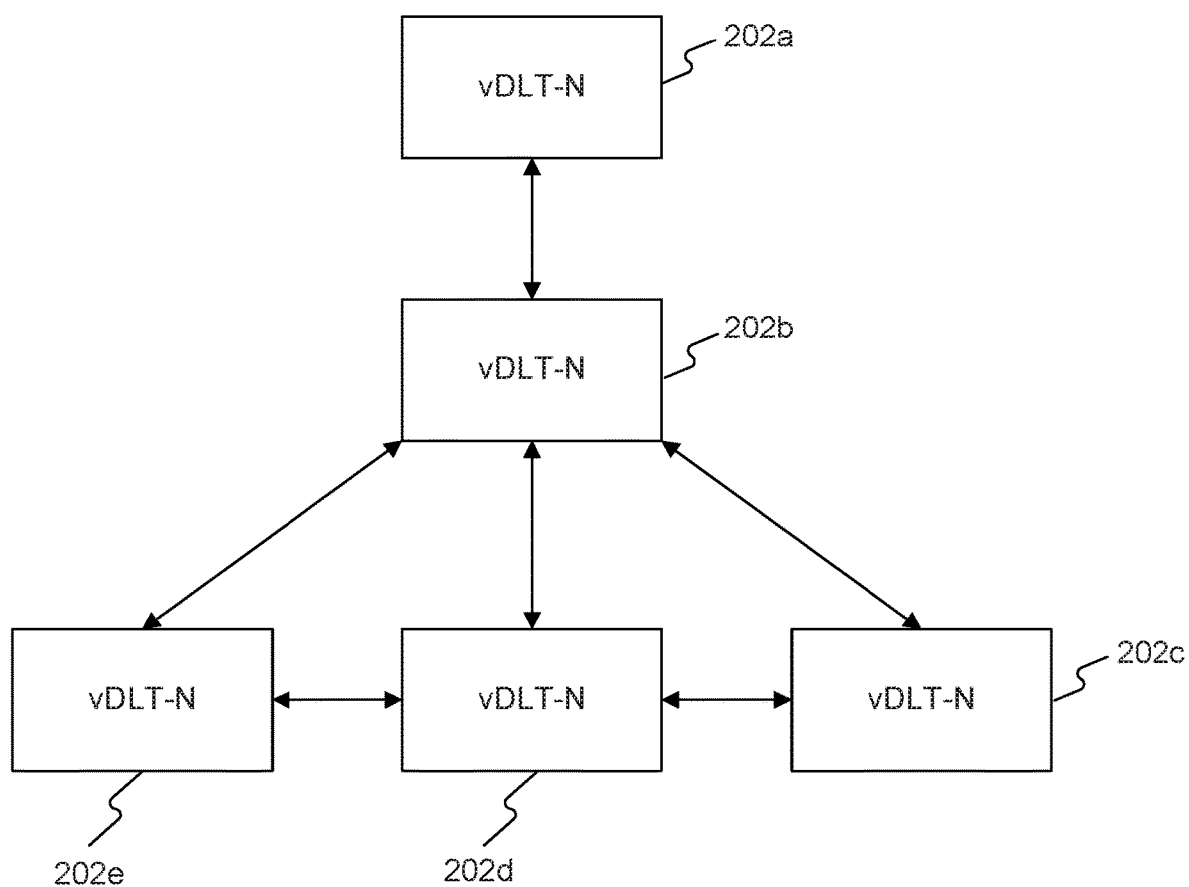
FIG. 2 is a diagram of an exemplary network configuration according to some embodiments of the present disclosure.

FIG. 2 illustrates a blockchain-DLT platform 200. In an exemplary embodiment, a blockchain-DLT platform 200 is a microservices-based configurable vDLT platform and runs on a scalable infrastructure either in the cloud or in-network or at the edge of a network and can run in a distributed manner across such infrastructure. It can support multiple virtual DLT Networks (vDLT-Ns) 202a-202e concurrently, where these vDLT-Ns can run completely independently of each other or can also interact with each other. Any arbitrary network of vDLT-Ns that can be configured in the system to interact with each other, where such a network of vDLT-Ns can be hierarchical and/or distributed in nature. For example, FIG. 2 shows a hierarchical vDLT-Ns in which 202a is in the top level, 202b is in the intermediate level, and 202c, 202d, and 202e are in the bottom level of the hierarchy.

Figure 3:
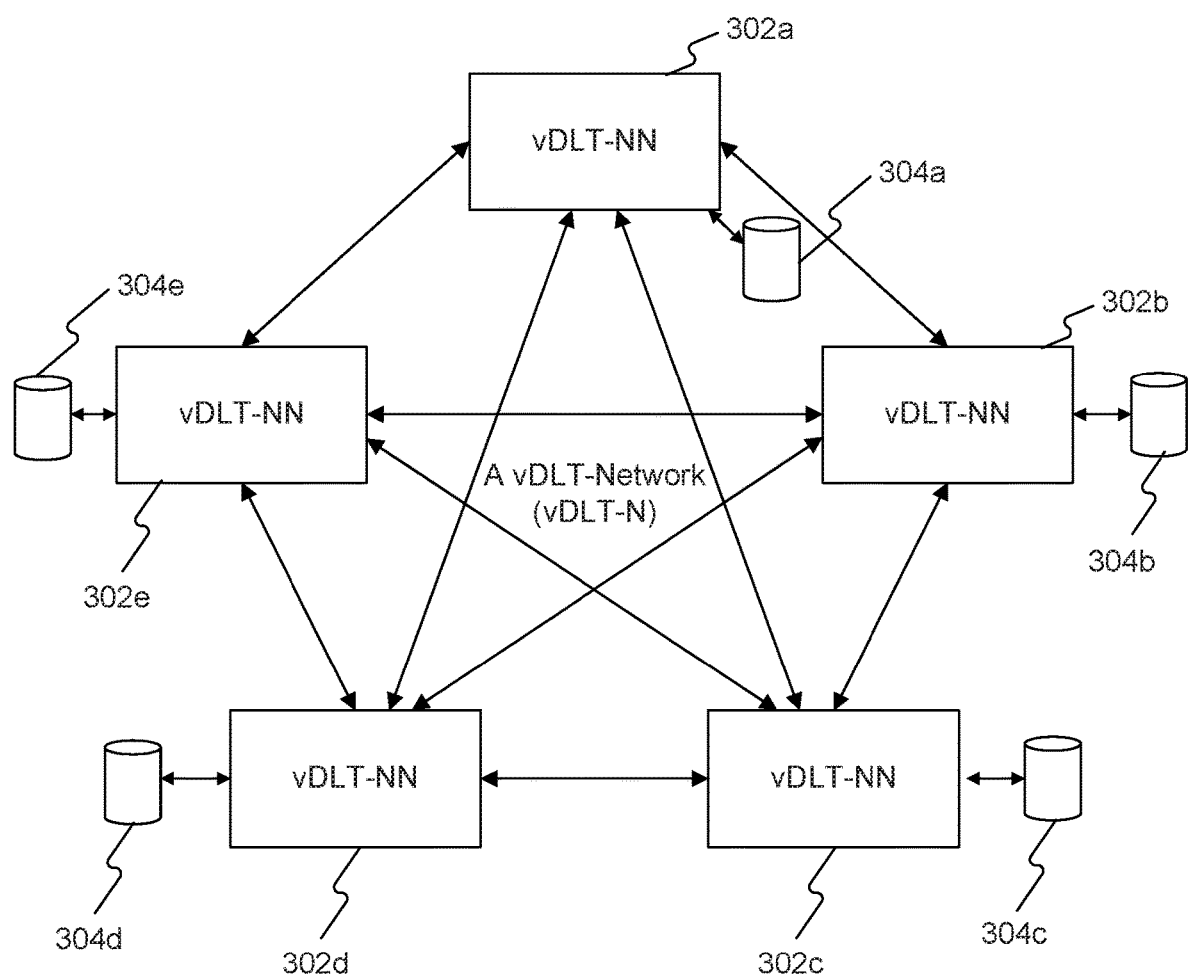
FIG. 3 is a diagram of another exemplary network configuration according to some embodiments of the present disclosure.

FIG. 3 illustrates an exemplary virtual DLT network (vDLT-N) 300. In an embodiment, each vDLT-N can represent a blockchain system consisting of participating nodes where each ledger in the distributed ledger system records transactions such that blocks of transactions are chained by a cryptographic hash propagating from one block to the next. Each vDLT-N may support a distributed ledger technology (DLT) capability consisting of a network of virtual DLT Network Nodes (vDLT-NNs) 302a-302e.

In some embodiments, each of vDLT-NN 302a-302e may include a corresponding one of a plurality of electronic data storage units 304a-304e. The data storage units may include a volatile or non-volatile, magnetic, semiconductor, tape, optical, removable, nonremovable, or other type of storage device or non-transitory computer-readable medium. Data storage units may include two or more memory devices distributed over a local or wide area network, or may include a single memory device. In certain embodiments, the data storage units may include database systems, such as database storage devices, including one or more database processing devices configured to receive instructions to access, process, and send information stored in the storage devices. By way of example, database systems may include Oracle™ databases, Sybase™ databases, or other relational databases or non-relational databases, such as Hadoop sequence files, HBase, or Cassandra.

In some embodiments, a vDLT-NN may include one or more processors configured to execute instructions consistent with the disclosed embodiments. The one or more processors may be hardware processors that can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in a memory of the computing node or in a data storage unit, which causes the processor(s) to perform actions consistent with disclosed embodiments, e.g., for implementing a virtual distributed ledger network. In an embodiment, the system can be implemented in a variety of computing systems, such as laptop computers, notebooks, hand-held devices, workstations, mainframe computers, servers, a network cloud and the like.

In some embodiments, a vDLT-N can support a blockchain-based DLT system where the term "blockchain" refers to the traditional definition of a distributed ledger technology implementation that records transactions in a ledger using a chain of blocks with the propagation of a cryptographic block hash from one block to the next, where each block can contain information corresponding to zero or more transactions. This type of a ledger is referred to henceforth as a blockchain-based ledger. In some embodiments, a genesis (first) block in a blockchain ledger typically does not contain data related to any specific transaction (hence zero transactions) after which subsequent blocks can contain data related to one or more transactions. A vDLT-N can also support non-blockchain DLT-based system with a set of distributed non-blockchain-based ledgers (where transactions are replicated to nodes without a blockchain-based ledger being created at each node) across nodes (for example where transactions are selectively replicated across nodes in the system without a blockchain-based ledger being created at each node).

Figure 4:
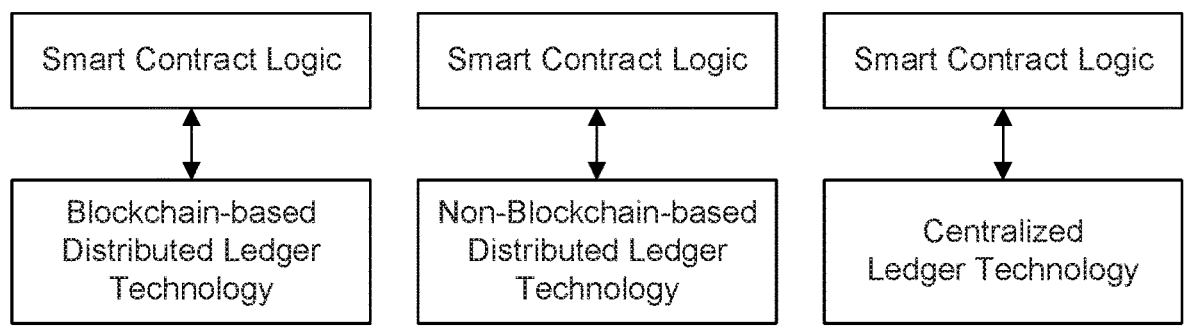
FIG. 4 is an illustration of supported network types according to some embodiments of the present disclosure.

The blockchain platform may configure a vDLT-N as needed for various use-cases and has the ability to concurrently support multiple vDLT-Ns as shown in FIG. 4. For example, as illustrated in FIG. 4, smart contract logic may be applied using blockchain-based distributed ledger technology, non-blockchain-based ledger technology, or centralized ledger technology.

Each virtual DLT network node (vDLT-NN) may include one or more microservices for processing tasks within the vDLT-NN. Each vDLT-NN can be a participant in one or more vDLT-Ns. The vDLT-NN can dynamically scale and utilize compute, storage, network, or energy resources, dynamically adapting based on the current transaction load in the vDLT-NN, and projected future requirements for processing at the vDLT-NN. These compute, storage, network, or energy resources can be distributed across one or more physical networks.

In another embodiment, a vDLT-N may represent a centralized ledger technology, where the information in the centralized stored ledger at a vDLT-NN that can be shared across other vDLT-NNs in the vDLT-N using broadcast mechanisms or selective replication or pub-sub mechanisms.

Figure 5:
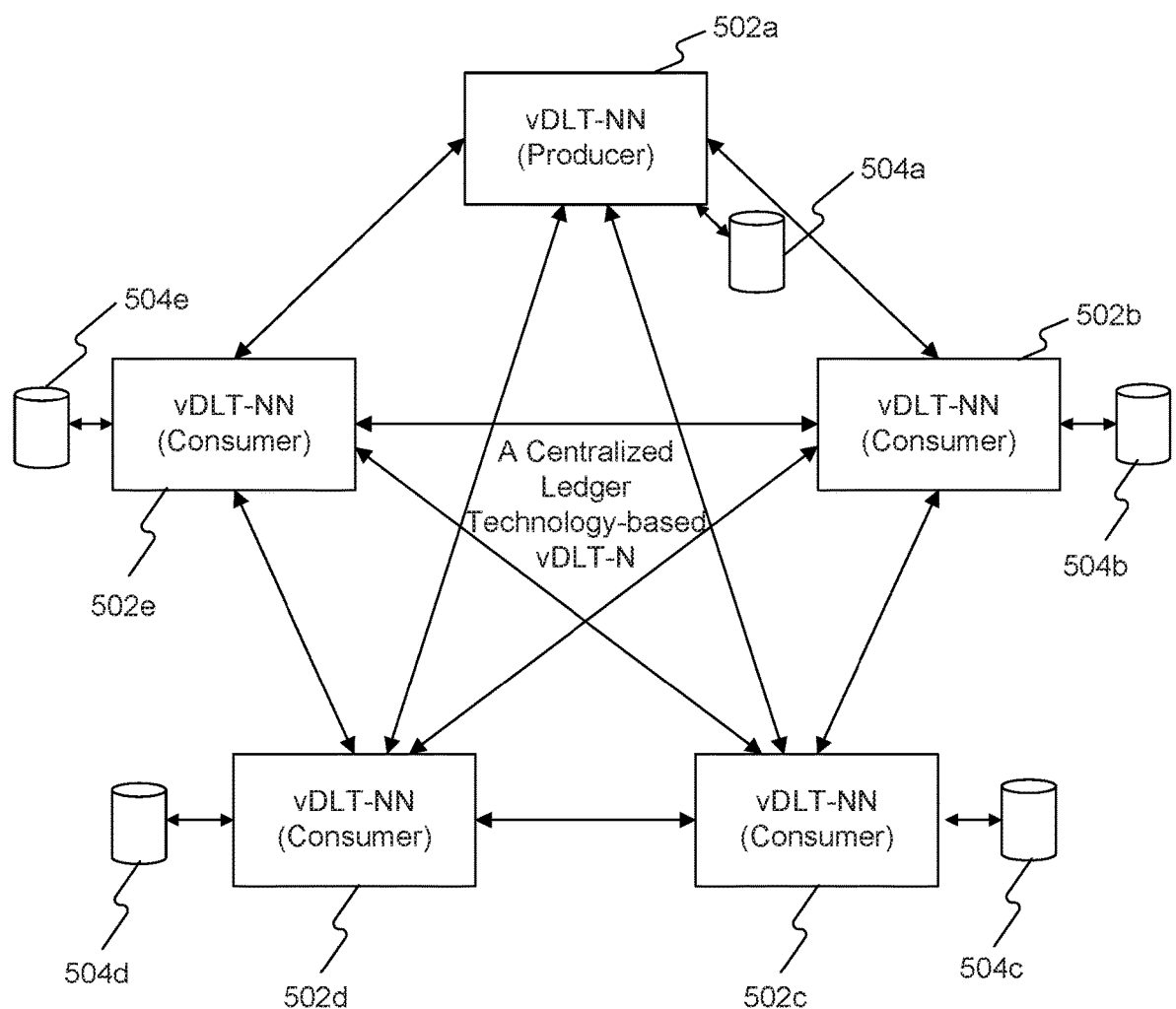
FIG. 5 is an illustration of an exemplary distributed network according to some embodiments of the present disclosure.

FIG. 5 is an illustration of an exemplary distributed network according to some embodiments of the present disclosure. In an embodiment, shown in FIG. 5, variations of vDLT-Ns can be supported by the system, the ability to execute smart contracts in the system is supported, so that the smart contract logic that was utilized to produce a transaction is stored along with the transaction information in each ledger in a vDLT-N 500. With centralized ledger technology, one of the vDLT-NNs 502a can be a producer, whereas the other vDLT-NNs 502b-502e in the vDLT-N 500 would be consumers with replicated ledgers or selectively replicated ledgers. In that regard, a centralized ledger technology can also result in a DLT system with a delayed replication or selective replication from the producer vDLT-NN to the consumer vDLT-NNs. Similar to FIG. 3, each of the vDLT-NNs may include a corresponding one of a plurality of data storage units 504a-504e and may also include one or more processors.

Steps for vDLT Blockchain Provisioning:

In another embodiment, a vDLT-N can be configured with multiple "master" centralized ledgers, where each "master" centralized ledger could have a different vDLT-NN as the producer with other vDLT-NNs acting as the consumers containing replicated or selectively replicated "slave" ledgers. This effectively can implement a DLT with multiple ledgers at each node with delayed asynchronous replication across nodes, such that the "master" centralized ledgers do not need to coordinate with each other to produce a single ledger across the vDLT-NNs. This may help to provide higher transaction throughput relative to a single synchronously updated distributed ledger across all nodes. In such a case, a master ledger could be either a blockchain-based ledger or a non-blockchain-based ledger. The asynchronous updates from the master ledger to the slave ledgers can be provided based on a delay tolerance associated with these updates. For every pair of vDLT-NNs (i,j), there may be an associated delay tolerance measure $\lambda_{i,j}$. The vDLT-NNs in the network may estimate pairwise inter-node latencies $\alpha_{i,j}$ (for example using periodic ping measurements of packet delays between each other). A master node may choose to aggregate and send a bulk update to a slave node. This can be based on an aggregation-delay-allowance $\pi_{i,j}$ where $\pi_{i,j}=\lambda_{i,j}-\alpha_{i,j}$. A master node may choose to delay an update to a slave node by a delay $\delta_{i,j} \leq \pi_{i,j}$, when communicating an update individually with respect to each slave node. Let the set of slave nodes be S relative to a master node i where the set S could be a subset of vDLT-NN nodes in the vDLT-N. If the master producer node i performs a broadcast to a group of slave consumer nodes jεS that need to receive the update, then it needs to adhere to a constraint given by $\delta_i \leq \min_j(\pi_{i,j})$ across the group of slave consumer nodes jεS. The inter-node latencies $\alpha_{i,j}$ can be periodically monitored and updated in the vDLT-NNs if desired. If a broadcast mechanism is used (for example using a distributed streaming platform such as Kafka), then the inter-node latencies $\alpha_{i,j}$ would be estimated based on typical observed message delays using such a mechanism or platform.

In some embodiments, such a system may allow a master producer node to tamper with the data until the data is actually distributed to the slave consumer nodes. However, allowing for such a delay may avoid the need for a synchronous consensus across all nodes as such a consensus can incur significant latencies depending on the inter-node latencies in the network. The vDLT-NN may be instantiated in different data centers so that the inter-node latencies can be significant. In some embodiments, any node may be a master producer node in a vDLT-N. For this purpose, each vDLT-NN can maintain a production ledger for transactions that it produces, along with consumption ledgers that it consumes asynchronously. Such asynchronous updates can provide to be very useful in emerging 4G/5G/6G/future distributed virtualized infrastructure with cloud/in-network/edge-data-centers providing services to people. vDLT-NNs could be hosted in any level in a hierarchical/distributed data center system to include vDLT-Ns.

In some embodiments, a vDLT-N can host more than one ledger where each ledger can be shared across all the participating vDLT-NNs or any subset of participating vDLT-NNs in the vDLT-N. In the producer-consumer/master-slave variant, each such ledger may have any participating vDLT-NN as a master producer node, or any subset of participating vDLT-NNs as master co-producer nodes, with the remaining participating vDLT-NNs or a subset of the remaining participating vDLT-NNs as slave consumer nodes. In addition, a vDLT-NN could be a participant in ledgers across multiple vDLT-Ns.

When using asynchronous lazy updates to slave consuming nodes, the system may not seek consensus from these consuming nodes. Therefore, it is possible that a slave node may have an issue with a transaction that was completed. For this purpose, and to address disputes in general, the system can support a Complaint Addressing Ledger (CAL) to resolve disputes. A past transaction could be addressed by a transaction id in a master ledger, and the ledger id associated with the master ledger, and the master(s) that produced the transaction. The slave nodes could periodically audit their own committed ledgers to identify any issues with past recorded transactions. Only the nodes participating in a past transaction may be provided access to the complaint lodged in a distributed complaint ledger for that past transaction. A pub-sub mechanism can be enabled for complaints lodged, so that the corresponding master nodes can address an issue. Resolutions related to such issues can also be recorded in the complaint ledger. Future reads in the overall vDLT-N system may require a check in the complaint ledger to identify any potential issues and possible resolutions associated with past transactions.

In another embodiment, the system can support a synchronous update to distributed ledgers, or a hybrid combination of synchronous and asynchronous updates to distributed ledgers. In cases using a synchronous update, such as use-cases that demand higher degree of trust relative to an asynchronous ledger update-based approach, the system may force a consensus across nodes to allow a synchronous update to the ledgers on all nodes. This may result in a lower transaction throughput relative to asynchronous ledger updates from producing nodes to consuming nodes, while providing a greater trust enabled in the system. When consensus is desired, any configurable consensus protocol may be used such as Byzantine Fault Tolerance, Practical Byzantine Fault Tolerance, Proof of Work, Proof of Stake, a Delegated Proof of Stake, a majority vote, an all-in-agreement vote, a vote based on percentage/fraction of votes, or a Raft Consensus, or any other algorithm that may be desired. In some use-cases, only one node may be a master producer node. In some other use-cases, more than one node could be a producer node, so that a transaction can have multiple masters or co-producers.

In some embodiments, if two or more nodes are co-producers of a transaction, then the system may use a consensus protocol across these co-producers with a synchronous ledger update across the co-producers, while using an asynchronous update to other slave consuming nodes. In another embodiment, the system can enable the generation of provenance information, as information related to assets in ledgers in the system are updated, the provenance information associated with an asset (such as the current location of goods being shipped, or the current working location of a UN refugee, or the current value associated with an asset such as remaining balance in a purchase order, or the current remaining balance in a healthcare insurance policy for a person, etc.) can be maintained in a provenance ledger. Any change to a specific asset based on a transaction in an originating ledger (that originally recorded the transaction) may be mirrored in a provenance ledger associated with the asset for faster access to such information.

Such a provenance ledger could be created at a specific vDLT-NN if desired, or could create as a distributed ledger as well across the vDLT-NNs. It is possible that while an originating ledger is blockchain-based, the provenance ledger can be non-blockchain-based merely to provide faster access to the provenance information associated with the asset. The provenance ledger can maintain information associated with the originating ledger associated with the transaction. However, an application can cross-verify vis-à-vis, the originating ledger to validate the information in the provenance ledger. A publish-subscribe mechanism can also be used to update subscribers (such as the providers of food shipments to UN refugees) with regard to published updates associated with an asset in the provenance ledger. The system can also replicate ledger information from a blockchain-based ledger into an alternate storage space/file-system or database that allows faster read access. In general, provenance information may be proactively created in provenance ledgers associated with assets, or obtained by merely querying the original ledger, or obtained from an alternate non-blockchain-based file system or data base.

In another embodiment, a particular physical entity or organization in the vDLT-platform may be a participant in multiple vDLT-Ns. This may be supported by having different vDLT-NNs in different vDLT-Ns for that entity or organization. In some embodiments, for a given use-case or a tenant in the system, the same vDLT-NN may need to simultaneously participate in multiple vDLT-Ns. Such a system may allow participation for one vDLT-NN in multiple vDLT-Ns. In addition, a group of vDLT-NNs could participate in two or more vDLT-Ns, where each vDLT-N could support different kinds of ledger updates (synchronous or asynchronous) or different kinds of consensus protocols, such that different transactions related to the vDLT-NNs could be processed in different vDLT-Ns. Thus, the system may provide configurability in vDLT-Ns and concurrent heterogeneous vDLT-Ns to support different requirements for a specific tenant or a use-case in the system.

In another embodiment, the system may comprise a master node and N consumer nodes, which may be partitioned based on the inter-mode latencies. For example, k of the consumer nodes may be considered local, whereas (N–k) of the consumer nodes may be considered remote, based for example on the inter-node latencies. The (N–k) remote consumer nodes may be asynchronously updated. The k local consumer nodes may be either synchronously updated, or asynchronously updated but with a lower delay compared to the k remote nodes. In the scenario that the k local consumer nodes are asynchronously updated, the master node may first write to its own ledger, and then publish the update to the k local nodes, which may receive the updates earlier than the k remote nodes.

Moreover, of the k local consumer nodes, m local consumer nodes may be updated synchronously with the master nodes, whereas the other (k–m) local consumer nodes may be updated asynchronously. The set of synchronously-updated m local consumer nodes and the set asynchronously-updated (k–m) local consumer nodes may be dynamically varied. Persons of skill in the art will understand that synchronous updating does not require that all synchronously updated consumer nodes are updated at exactly the same time, but that they are updated independently at a slightly different time relative to the other synchronously updated consumer nodes.

Moreover, a group of nodes may share a ledger. For example, the master ledger may be replicated to another copy. That copy may be used by the master or other local consumer nodes that share that copy (for example to enable reads). The reads to the ledger may thus accessed on a different path (to this replicated ledger database), relative to the original write path for the master ledger database. This can help to improve performance, by separating reads from writes.

In another embodiment, an application layer request into the system can require the execution of multiple smart contracts in sequence, with state transitions from one state to the next, until the requirements associated with an application layer request is completed. For such a case, a composite smart contract consisting of the respective smart contracts in sequence can be designed and executed on the vDLT platform. During the processing of such a state transition graph, certain smart contracts may be executed independently of each other. In such a case, microservices associated with the processing of such smart contracts can execute concurrently leveraging the virtualized and distributed resources in the vDLT system. Thus, an overall state transition graph for a composite smart contract may include the execution of smart contracts in sequence, with parallel execution of smart contracts when possible.

In another embodiment, a microservice in a vDLT-NN can execute in a container or a virtual machine on a physical computing node in the distributed infrastructure. A load balancer may be used in the system to distribute the load across instances of a given microservice in the system. Each vDLT-N may include multiple vDLT-NNs, along with other nodes that may not have a vDLT-N capability, such as a statically configured physical compute server that does not dynamically scale but which is assigned to execute a specific task, such as providing support for a certificate authority in the system. Each vDLT-N may host one or more ledgers across the nodes in the network, where each ledger can be hosted as a distributed ledger in the virtual DLT network. Smart contracts may be executed as microservices on a vDLT-NN. The front-end applications executing in the scalable distributed infrastructure can make requests to vDLT-NNs in a vDLT-N to execute smart contracts. When such a request for the execution of a smart contract reaches a vDLT-N, based on the nature of the request, the vDLT-Ns that need to execute the smart contract are identified, and the request is submitted to each such vDLT-N.

Figure 6:
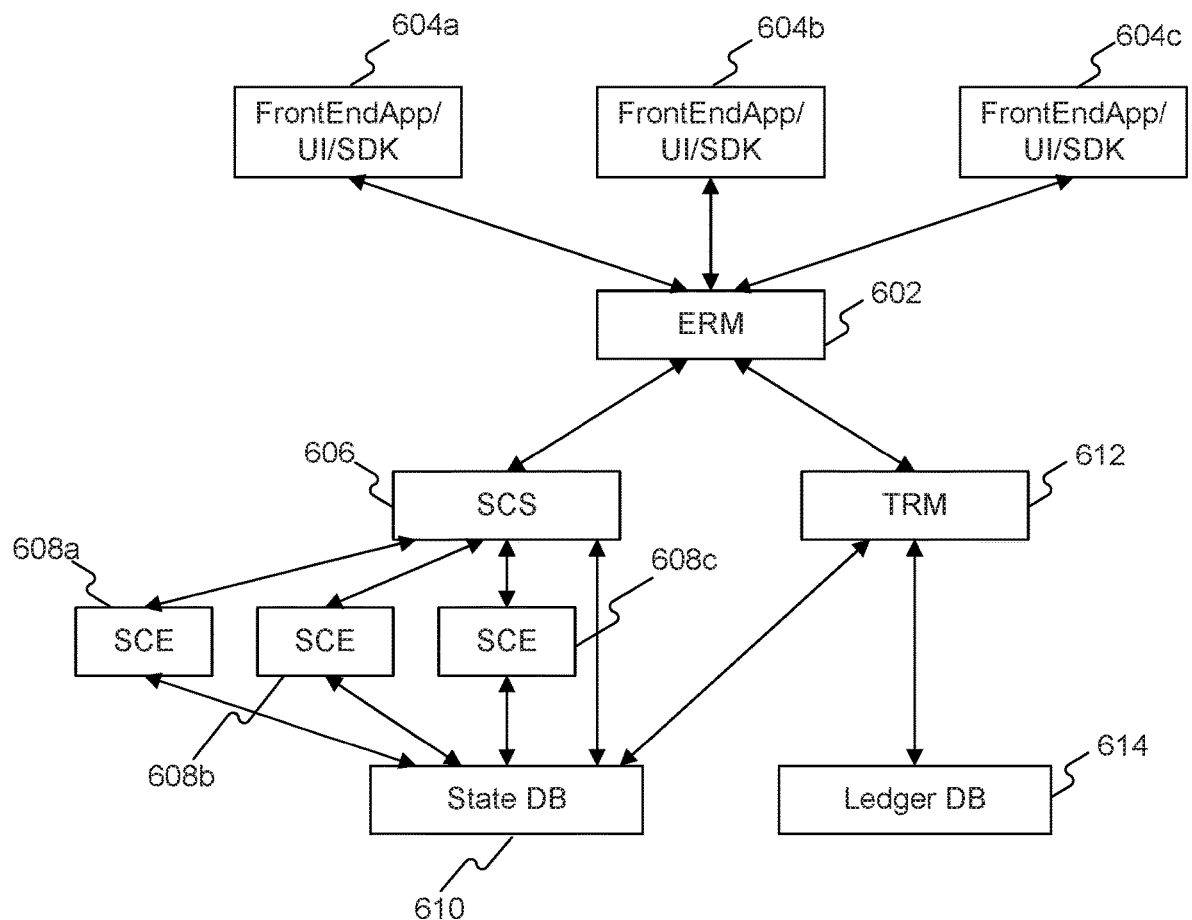
FIG. 6 is a diagram of an exemplary smart contract microservices execution according to some embodiments of the present disclosure.

FIG. 6 is a diagram of an exemplary smart contract microservices execution according to some embodiments of the present disclosure. Referring to FIG. 6, in an embodiment, within a vDLT-NN, an event routing manager (ERM) microservice 602 may receive the request from a front-end app, user interface (UI), or software development kit (SDK), for example, FrontEndApp/UI/SDKs 604a-604c, and forward it to a smart contract service (SCS) microservice 606, which then invokes the microservice specific to the smart contract that was requested for processing (e.g., smart contract execution (SCE) microservices 608a-608c). SCE microservices 608a-608c may communicate with state database 610 or other data storage unit. In some embodiments, SCS microservice 606 may communicate directly with state database 610.

In some embodiments, REST-based protocols or pub-sub based interfaces (using Kafka for example), or peer2peer dedicated connectivity (utilizing Netty for example) may be used for interaction between the microservices on a vDLT node. The specific smart contract microservice (e.g., SCE microservice 608a-608c) after execution may return results to the SCS 606, which in term returns the results to the ERM 602. The ERM 602 may then invoke the Transaction Resource Manager (TRM) microservice 612, where the TRM 612 commits the outcome of the smart contract processing into a ledger 614 in the vDLT-NN. When the smart contract is executed in a distributed manner across multiple vDLT-NNs, then a consensus protocol may be used before committing the transaction to a distributed ledger across the vDLT network nodes in the vDLT network.

Figure 7:
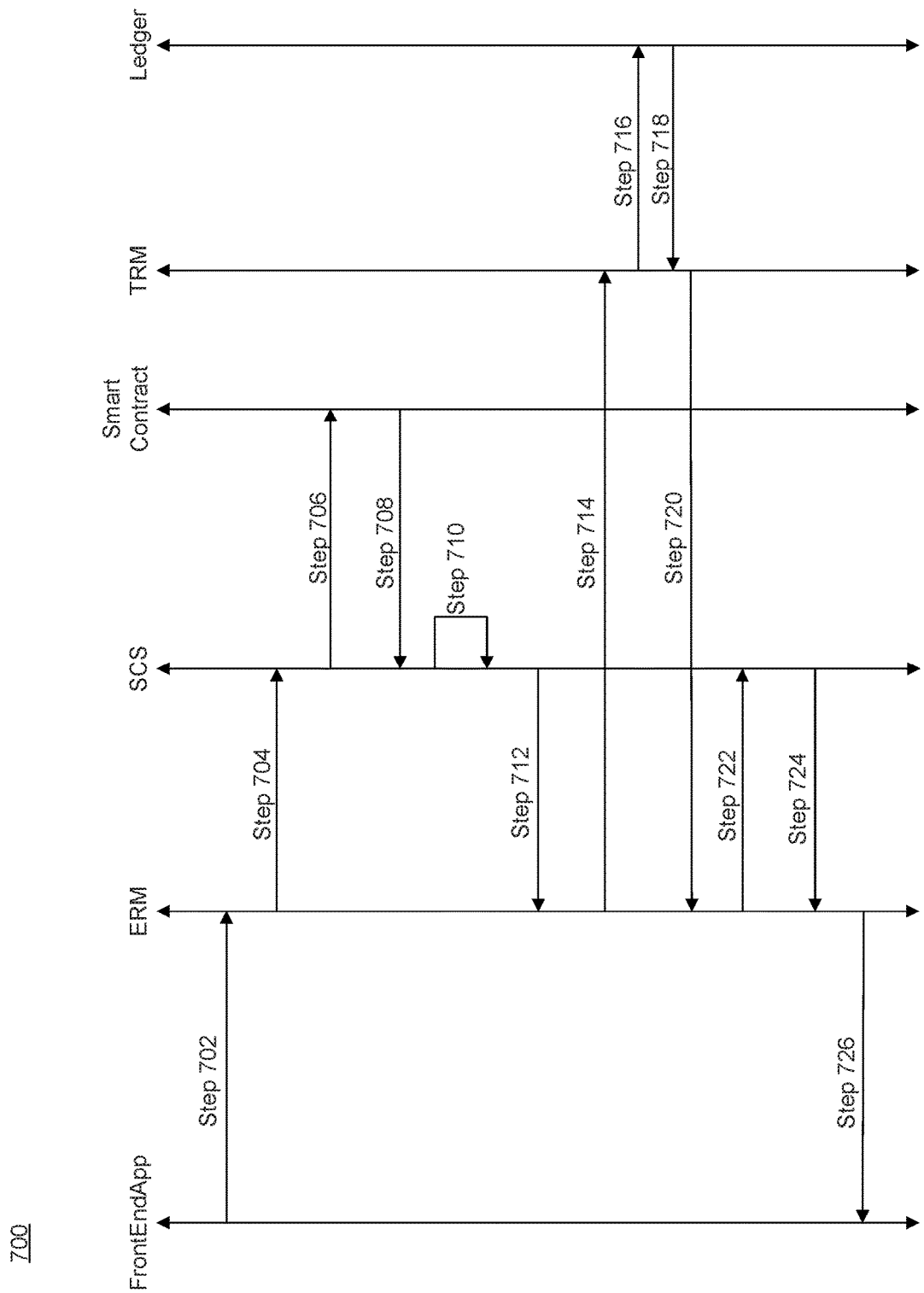
FIG. 7 is a diagram of an exemplary call flow for smart contract microservice execution according to some embodiments of the present disclosure.

FIG. 7 illustrates a flowchart of a process 700. At a step 702, a front end application (e.g., 604a-604c of FIG. 6) may transmit a smart contract request to an ERM (e.g., ERM 602 of FIG. 6). At a step 704, the ERM may route the request to an SCS microservice (e.g., SCS 606 of FIG. 6). Based on information received from the requesting entity, at a step 706, the SCS microservice may send the request to a SCE microservice (e.g., SCE microservice 608a-608c of FIG. 6). At a step 708, the specific SCE microservice may deliver the transaction outcome to the SCS. At a step 710, consensus protocol management may confirm consensus among the nodes of the vDLT network to record the transaction. At a step 712, the transaction outcome, upon receiving appropriate consensus from the nodes of the vDLT network, is sent to the ERM for recordation in the ledger (e.g., ledger 614 of FIG. 6). At a step 714, the ERM delivers the transaction output to a TRM (e.g., TRM 612 of FIG. 6) for recording in the ledger. At a step 716, the TRM causes the transaction output to be recorded in the ledger. At a step 718, the TRM receives acknowledgement of the recording. At a step 720, the TRM transmits the acknowledgement to the ERM, which, in turn, communicates the acknowledgement to the SCS microservice at a step 722. At a step 724, the SCS microservice transmits the transaction outcome to the ERM for delivery to the requesting front-end application. At a step 726, the ERM returns the transaction output to the front-end application.

In another embodiment, a DLT system required to implement a specific use-case or a tenant may require one or more vDLT networks. A Policy Resource Manager (PRM) microservice may be used in this vDLT platform to setup the desired DLT networks (vDLT-Ns). Within each vDLT-N, the PRM is further utilized to set up vDLT-network nodes (vDLT-NNs) participating in a vDLT-N and is also used to create policies associated with different transactions and their associated smart contracts to determine the vDLT-NNs that would be involved in a consensus protocol for the transaction. The nodes involved in the consensus protocol may be configurable for each transaction and may be specified for a group of transactions. Smart contracts may be invoked as Smart Contract Execution (SCE) microservices on the vDLT platform. If an SCE is deployed across vDLT-NNs (deployed as an "<sce-name>.jar" file for example), the platform can perform a consistency check at the time of deployment, and periodically as well, to compute the hash of the SCE code on each vDLT-NN, and arrive at a consensus on the platform on the value of the hash across vDLT-NNs.

In another embodiment, the consensus protocol itself can be configurable for each transaction or a group of transactions. The configurability of the nodes involved in a consensus protocol can be static or dynamic. The choice of the consensus protocol can also be static or dynamic.

In another embodiment, within each vDLT node, the system may further configure policies associated with smart contract processing, which can include interactions with external systems to obtain endorsements for the execution of the smart contract in the vDLT node.

The PRM may configure the policies associated with processing of the consensus protocol, and the nature of the consensus protocol, in a policy database in the vDLT network. Subsequently, policies associated with transactions (such as interactions with any external or other participating entities for endorsements) may be programmed into a policy database at the SCS within a vDLT node. Whenever there is a change to a policy, the policy database for the DLT network, or the policy database at the SCS in each vDLT network node may be reconfigured.

In another embodiment, endorsements in the platform can include digital signatures by vDLT network nodes approving the data associated with a transaction. A digital signature may include a hash of the transaction of the transaction data signed by a private key associated with the endorser. For fast validation of such digital signatures in endorsements, the public keys associated with endorsing nodes can be stored in a local database on the vDLT platform, for example, to avoid latencies associated with interaction with certificate authorities that could be remotely located physical relative to the physical location of resources being utilized by the vDLT-N.

Secure communications between microservices in the vDLT platform may be performed using asymmetric key cryptography (Rivest-Shamir-Adleman (RSA)/elliptic curve-based PKI systems) for encrypted information transfers, or performed using a shared key using symmetric key cryptography (such as Advanced Encryption Standard) and exchanged with asymmetric key cryptography, could be performed using tokens (such as OAuth-protocol-based) that can be refreshed periodically. The security keys may be distributed using key distribution protocols such as the Diffie-Helman algorithm. Hierarchical key management with key derivation protocols using HMAC algorithms with hashing algorithms based on SHA-256 or SHA-512 can be used. For generation of hashes, a SHA-256 or a higher dimensional post-quantum hashing algorithm such as SHA-512 can also be used. The cryptography protocols used by the platform may be configurable such that higher dimensional post-quantum algorithms can be used if desired.

When a transaction request is submitted to a DLT network, the policy database at the DLT network may be queried to determine the vDLT nodes that will participate in the consensus protocol, and to determine the consensus protocol to use across the vDLT nodes. Subsequently, within each vDLT node, the policy database at the SCS may be queried to assist in the execution of the smart contract (such as determining any entities that need to endorse the transaction).

When consensus is required across vDLT nodes in a DLT network, a consensus processing microservice may be utilized in each vDLT-NN that executes in a distributed manner across vDLT-NNs in the network to approve or reject the outcome of smart contract processing in the vDLT nodes. Different variants of consensus protocols may be supported such as k-out-of-N or utilizing a specific set of nodes to approve/endorse a transaction. Subsequently the TRM can record the transaction in the local ledger database at the vDLT node. If such a consensus across vDLT nodes is not required, then the TRM may directly commit the transaction to its local ledger database. Multiple transactions can be in progress concurrently so that an order placer can be utilized to sequence transactions prior to committing transactions in a local ledger database at a vDLT.

In another embodiment, the blockchain platform may be used for data privacy regulations related compliance processing. In this case, one of the requirements for such privacy regulations may be for a user to be able to control the access to different entities who might wish to have access to the data. At the same time, the user can choose to delete past data relating to the user as well. In this regard, the data may be kept off-chain, and such that only the actions related to the data privacy regulations processing are recorded on the blockchain platform. Therefore, any crude operations related to user data are performed on a data vault that resides external to the platform such as in a Hadoop distributed file system (HDFS) or interplanetary file system (IPFS) file system or an external structure query language (SQL) or NoSQL database or other file systems or databases. Thus, the control plane versus user/data plane is partitioned so that only the control plane related information is recorded on the blockchain platform.

Figure 8:
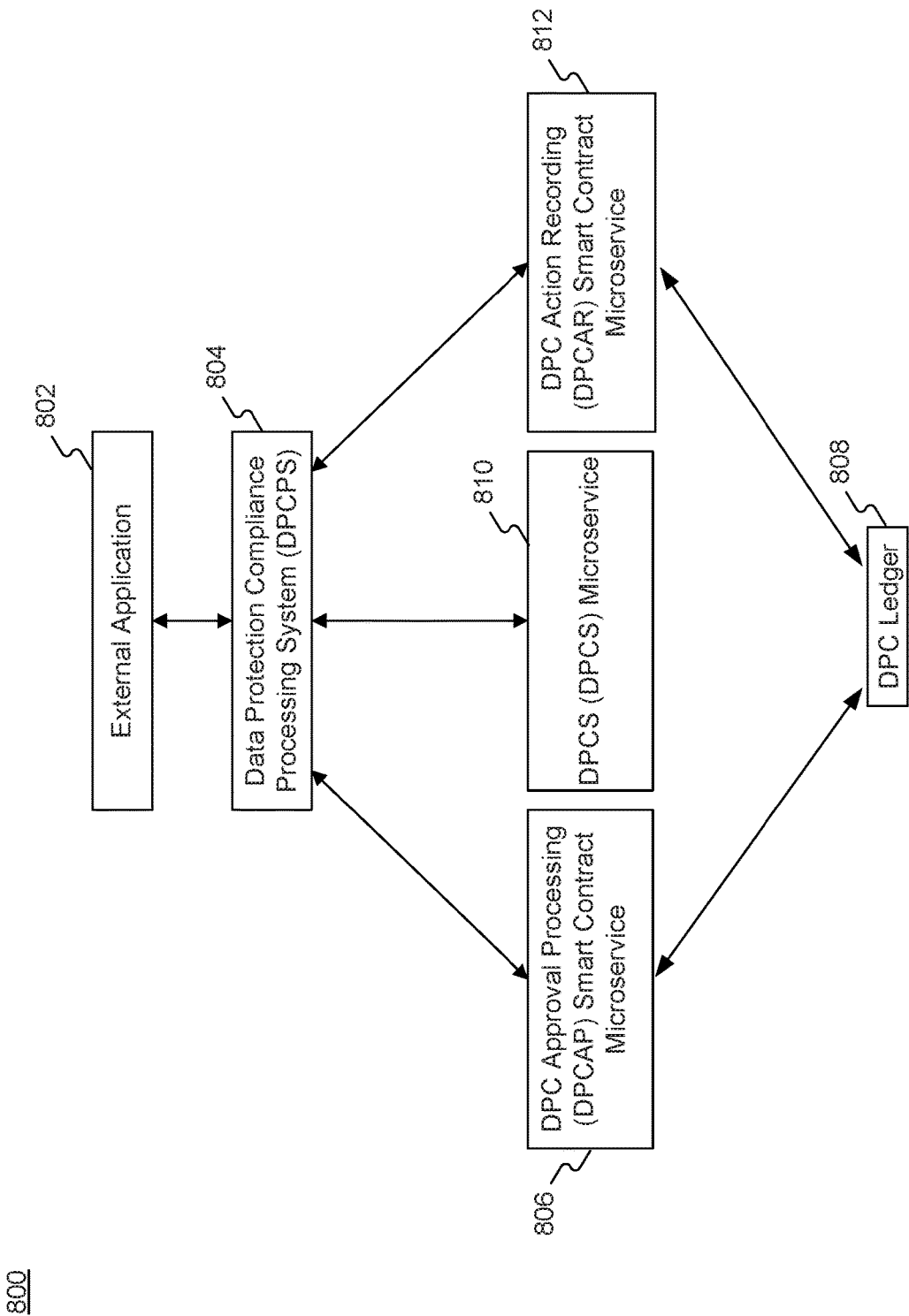
FIG. 8 is a diagram of data protection implementation in a distributed network according to some embodiments of the present disclosure.

FIG. 8 illustrates an access control check process 800 that may be performed prior to granting access for the read/write operation on the user data. For example, an external application 802 may request read/write access from a data protection compliance processing system (DPCPS) 804. The request may be a data protection compliance (DPC) request, requesting read/write access on user data. DPCPS 804 may execute a DPC approval processing smart contract microservice 806. Upon resolution of the request, the microservice 806 may record either approval or rejection in a DPC ledger 808 of the vDLT platform. DPCPS may also communicate with a DPCS microservice 810 to process the DPC request on an off-ledger-data-vault system (not shown). DPCPS 804 may also communicate with a DPC action recording smart contract microservice 812 to record DPC action on the DPC ledger 808.

The access control check 800 may be performed with respect to every field or attribute related to the user that needs to have data protection/privacy regulation checks. The successful passing of the DPC processing approval is recorded on a Data Protection Compliance (DPC) ledger. If desired, the rejection of a DPC processing approval request can also be recorded. In some embodiments, the rejections may be recorded to proactively monitor any Denial-of-Service attacks in the system. Subsequently, the CRUD (Create/Read/Update/Delete) or other requested action may be performed in the external data vault, and a record of the action is stored on the DPC ledger. To record the action, the nature of the action such as a change to a key associated with the data is stored on the DPC ledger (such as the "location" or "address" but not the actual value of the address or location). The actual data could contain both keys and values, such as the key "address" and the value (The actual address) associated with the key along with other information in a data structure that needs data protection/privacy compliance (for example such a data structure can be JSON-based or XML-based but not limited to such data structures). Now, a hash of the data can be recorded on the DPC ledger as part of the recording of the completion of the action.

Figure 9:
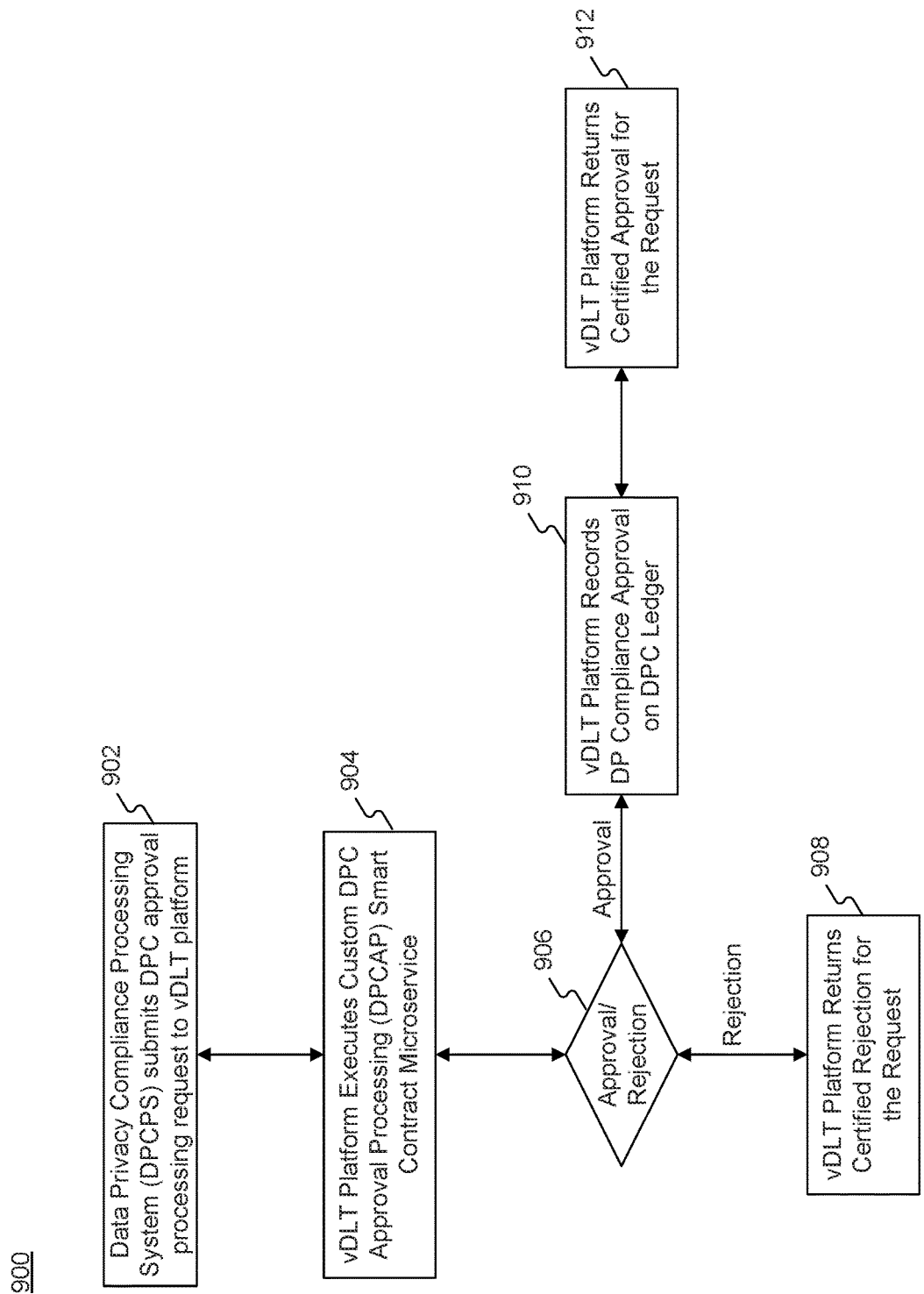
FIG. 9 is a diagram of a compliance and access control check according to some embodiments of the present disclosure.

FIG. 9 is a diagram of a compliance and access control check according to some embodiments of the present disclosure. In an embodiment, to provide additional security and privacy, a one-time random number (a nonce) can be generated and coupled with the data before the generation of the hash that would be recorded on the blockchain platform as shown in FIG. 9. In process 900, at a step 902 the DPCPS may submit a DPC approval processing request to the vDLT platform. At a step 904, the vDLT platform may execute a custom DPC approval processing (DPCAP) smart contract microservice. The DPCAP smart contract microservice may validate the certificate associated with the requestor, check access privileges of the requestor vis-à-vis the Data Request, compare with statically configured preferences, and obtain dynamic approvals if needed/allowed (such as from a mobile user) to approve/reject the request at a step 906. If the request is rejected, at a step 908 the vDLT platform may return a certified rejection of the request to the requesting application or to the DPCPS. At a step 910, if the request is approved, the vDLT platform may record DP compliance approval in the DPC ledger and at a step 912, the vDLT platform may return certified approval of the request, e.g., to DPCPS or to the requesting application.

In some embodiments, the random number generated may be used more than once for a certain period of time, especially if data records are frequently accessed, so that it OLDVS stores the generated random numbers and the time-interval of validity of each number, for the corresponding data that it was generated for. The random numbers can be changed at random or fixed intervals of time, or after the usage of the random number for a configurable threshold number of transactions or a combination of both thresholds (time duration threshold or a number of transactions threshold) has expired.

Figure 10:
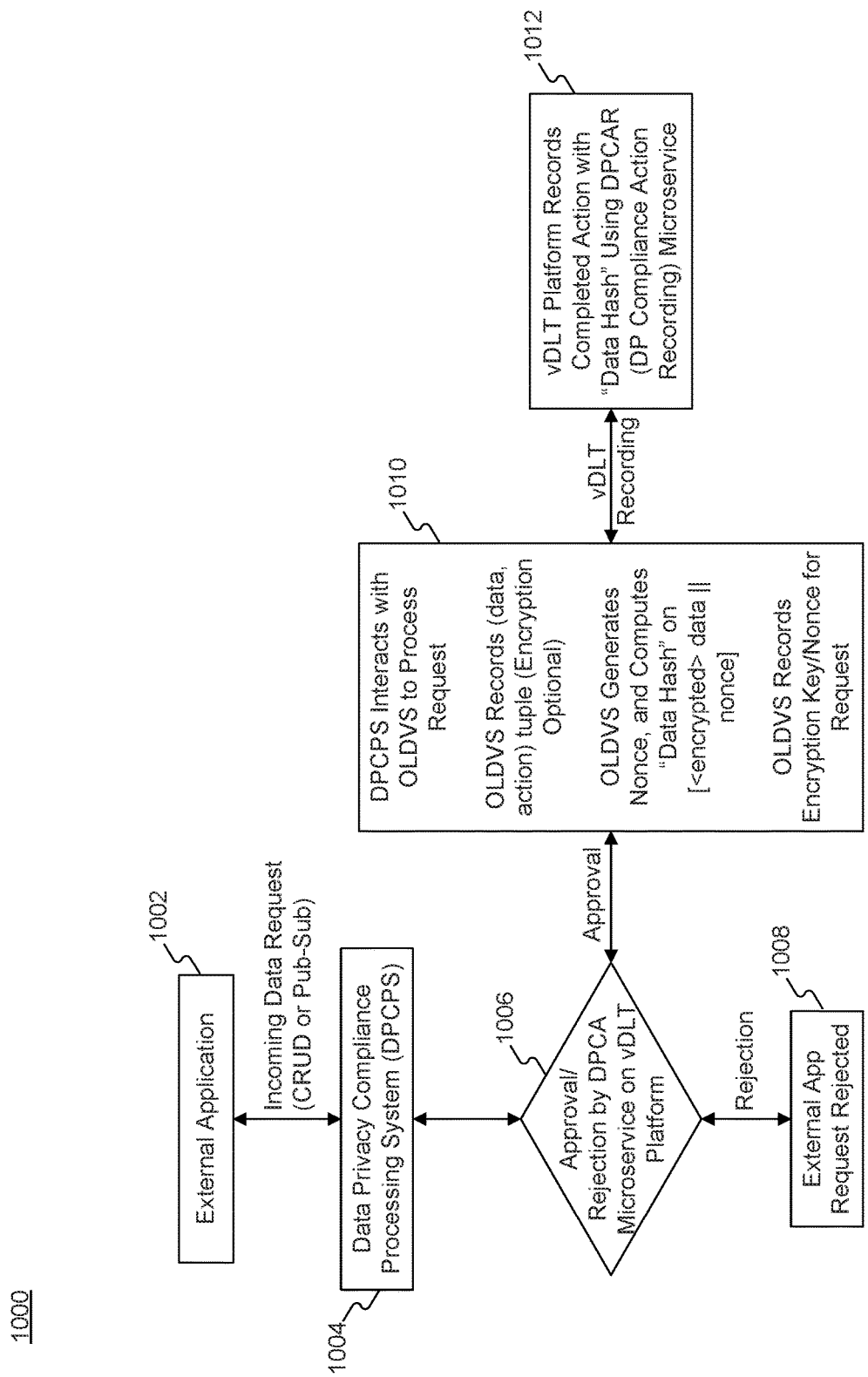
FIG. 10 is a diagram of a process for data privacy compliancy according to some embodiments of the present disclosure.

FIG. 10 is a diagram of a process for data privacy compliancy according to some embodiments of the present disclosure. Referring to FIG. 10, a process 1000 depicts a call flow for the process of FIG. 9. This involves a smart contract (SCE) execution for the compliance and access control checks (DPCAP—Data Protection Compliance Approval Processing smart contract microservice) and recording of the approval event on the DPC ledger, followed by the performing of the action relative to an external data vault, and the subsequent execution of a smart contract to record the completion of the action (DPCAR—Data Protection Compliance Action Record smart contract microservice) on the DPC ledger.

For example, in process 1000, at a step 1002, an external application may generate a CRUD or pub-sub data request. At a step 1004 the request may be received by DPCPS for processing. At a step 1006, DPCPS may communicate the request to a DPCA microservice on the vDLT platform for approval or denial. If the request is denied, at a step 1008, DPCPS may communicate the rejection to the external application. If the request is approved, at a step 1010, DPCPS may interact with OLDVS to process the request. For example, the OLDVS may record a tuple (data and/or action), which may or may not be encrypted. The OLDVS may generate a nonce and compute a data hash on the encrypted request data and the nonce. The OLDVS may then record the encryption key and nonce for the request. At a step 1012, the vDLT platform may record the completed action with the data hash using DPCAR microservice. In some embodiments, encryption, decryption, hashing, or signatures can be done based on post-quantum cryptography.

Figure 11:
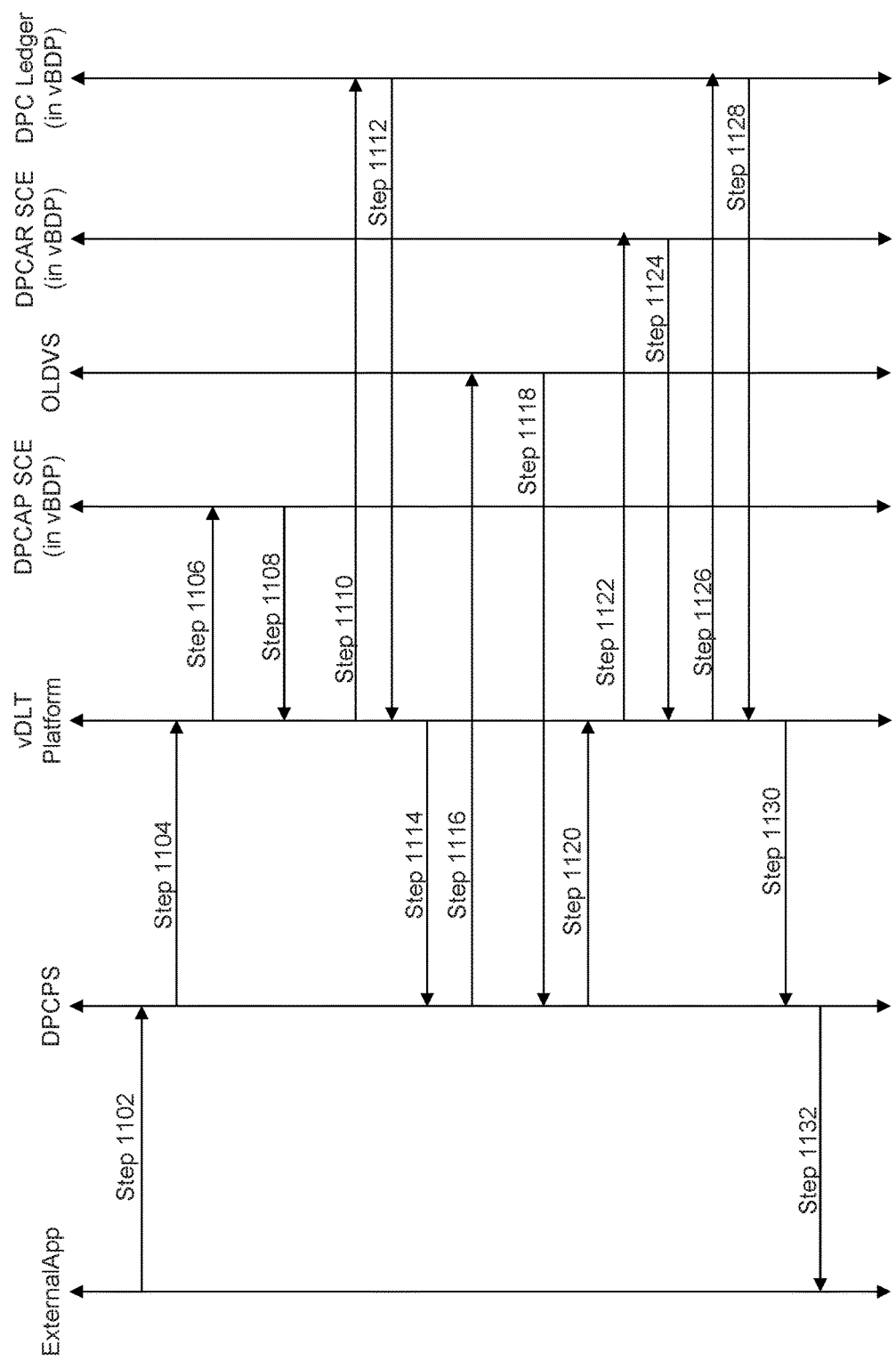
FIG. 11 is a diagram of a call flow related to data protection according to some embodiments of the present disclosure.

FIG. 11 is an exemplary flow call diagram for a process 1100 for data protection and privacy processing. At a step 1102, DPCPS may receive a data privacy compliance processing request from an external application. The DPCPS may communicate a DP compliance approval processing request to the vDLT platform at a step 1104. At a step 1106, the vDLT platform may transmit the request to the DCAP SCE microservice for processing. At a step 1108, the DCAP SCE transmits the result of the processing (e.g., approval or rejection) to the vDLT platform. If the request is approved, at a step 1110, the DPC approval processing is recorded on the DPC ledger, via the TRM. At a step 1112, acknowledgement of the recording may be sent to the vDLT platform, which then communicates the DPCAP response (e.g., the approval) to the DPCPS.

Upon receiving the response, at a step 1116, the DPCPS may process the DPC processing request with the OLDVS using the tuple (e.g., the data and action received with the request). At a step 1118, the DPCPS receives the response from the OLDVS, e.g., the data hash as described above. Using the data hash, at a step 1120, the DPCPS may generate a DP action record (DPCAR) request and transmit this request to the vDLT platform. The SCS microservice of the vDLT platform may then send a DPCAR SCE request to the DPCAR SCE microservice at a step 1122. At a step 1124, the DPCAR SCE microservice transmits a response to the SCS microservice of the vDLT platform. At a step 1126, via the TRM, the DP compliance action may be recorded in the DPC ledger. At a step 1128, an acknowledgment of the recording may be sent to the vDLT platform. In turn, the vDLT platform may send DPCAR acknowledgment to the DPCPS at step 1130, which transmits a response to the external application at step 1132.

In an embodiment, the vDLT platform may be implemented in an emergency healthcare system. An IoT/Wearables-based intelligent service hosted at a 5G edge server could call an ambulance for a patient. The patient may be driven to the nearest hospital. During the drive, patient data may be transferred over a blockchain network (a vDLTN) across hospitals. The patient/care-giver can give consent live, or alternatively a pre-authorized consent for the situation is stored to enable data transfer, which can be processed by a smart contract. Insurance processing could be concurrently performed on a blockchain network that includes the hospital and the insurance company serving the user. This would help with more efficient processing with emergency services provided to the patient at the hospital that the patient is driven to.

In another embodiment, the vDLT platform will help many use-cases intersecting with different areas such as 5G/IoT/AI. For example, 5G can allocate adequate dynamically scalable end-to-end resources for each IoT application or service in a 5G network (at the edge if required). The IoT systems can monitor and provide triggers for processing. The smart contracts can execute the distributed automated intelligence in the system. The blockchain platforms can record events in their ledgers based on the execution of the smart contracts. The information regarding the dynamic smart contracts for automated m2m intelligence executing in IoT devices can be recorded on blockchain ledgers to provide support for m2m compliance checking and auditing support.

In another embodiment, the vDLT platform can provide support for custom microservices such as the execution of zero knowledge proofs to only expose the information needed from the system. For this purpose, a smart contract for the zero-knowledge proof can be executed, and the outcome of the processing can be exposed to a requesting application. A compliance and access control check based on a smart contract can be performed prior to execution of the zero-knowledge proof smart contract microservice execution. The execution of the zero-knowledge proof microservice can include merely filtering out fields to expose only the needed fields. Additionally, such a microservice can include a transformation of one or more fields to expose the minimal information related to that field. For example, if user data includes the name, age, gender, address, and the income of the person, and if the application needs only the name and, in the income, then the other fields can be filtered out and only the specific name and income fields may be returned to the application. In addition, if the application only needs to verify that the income of the person is in a certain range, then the zero-knowledge proof microservice will return the name and the income range of the person, but not report the actual income of the person.

In another embodiment, the system can support microservices to perform learning and prediction to provide trusted machine learning services on the platform associated with transactions or data stored on the platform. The system can also have optimization-related microservices to compute utility functions for optimal decision-making on the platform. The system can also host a microservice for interaction with a remote data center. In particular, the system could perform distributed processing (such as distributed machine learning) across vDLT-Ns, with microservices providing support for distributed data center interaction to exchange information. The system can also support smart monitoring services based on publish-subscribe mechanisms to take proactive action on the platform, or to monitor for security attacks such as a Denial-of-Service (DoS) or Distributed-Denial-Of-Service (DDoS) attacks on the platform.

In another embodiment, an advertiser may request specific information related to a user, then the compliance checking smart contract microservice can verify the ability of the advertiser to access information related to a user. Subsequently, the information may be provided to the advertiser at a cost to the advertiser that is paid to the vDLT platform. The platform may choose to credit the user for utilization of the user information stored on the platform. If the advertiser targets a specific user based on the user's preferences, then the platform can charge the advertiser for such targeting and provide a partial credit to a user for such targeting. Based on the user's response to the advertisement (such as a mere presentation versus a click through or a purchase action, etc.), the charge associated with the delivery of the advertisement can vary. If an advertiser only obtains aggregate information related to a group of users, then it can be charged for such information, and each user in the group of users may receive a credit (potentially a smaller credit per user relative to direct targeting of a user). If the advertiser targets the group of users without knowing the actual users, then again it can be charged based on the number of users targeted, and respective actions of the users to the advertisement. Data protection/privacy compliance processing can be required when matching up an advertisement or a targeted message with a user model or a user preference or past stored user data on the platform. If a user model is derived based on the user data that is subject to data protection/privacy compliance, and such a user model is used, then the user model needs to be reflected based on current version of the user preferences or permissions provided relative to stored user data. If a previously permitted data for such usage is no longer permitted for use, then the user model needs to be derived again without such information. Likewise, if previously unpermitted data for such usage is now permitted by a user for such use, then the user model can be enhanced and derived based on the additional available permitted information associated with the user.

The smart contract microservices on the vDLT platform can be configured or dynamically reconfigured to allow appropriate value sharing across various entities as agreed upon by the participating entities in the system. Such value sharing can be performed using tokens transferred between the participating entities on the platform, where such tokens can have a monetary value that tracks a fiat currency. For example, the value of a token could be a small fraction of the US dollar or the Indian rupee. All such processing can be performed with smart contracts on the platform, with the vDLT platform creating a shared ledger between the advertiser and a network operator for the users.

Aspects of the disclosure are as follows:

The present disclosure provides implementation to create a virtual DLT node that includes one or more microservices with the ability to concurrently participate in multiple DLT networks, where the virtual DLT node utilizes compute, storage, and network resources that can be distributed across one or more physical networks; where a microservice for the virtual DLT node executes in a virtual machine or a container on a physical computing node; where the virtual DLT node is a member of a DLT network that includes the said virtual node and zero or more virtual DLT nodes as participants of that DLT network, where the DLT network may include additional participants that are not implemented as a virtual DLT node, but have the necessary functionality to participate in the DLT network as specified by that DLT network and where the DLT network hosts one or more ledgers and where each ledger is shared across one or more virtual DLT nodes that belong to the DLT network where the set of virtual DLT nodes sharing a ledger is a subset of the set of virtual DLT nodes that belong to a DLT network; where the virtual DLT node is a member of more than one DLT network where the microservices hosted at a virtual node include all the smart contracts needed to participate in each of the DLT networks that the node is a member of, is given a valid authentication identity for a DLT network by an identity and access management.

Another feature of this disclosure is an event routing manager microservice routes events between two microservices are hosted by a virtual DLT node where the virtual DLT node may include a replicated microservice for high availability and the replicated microservice can execute on different physical systems to provide better fault tolerance and isolation and elastic load balancer is utilized to distribute the processing load for a microservice across its replicated instances.

Another feature of this disclosure is that a vDLT network can utilize one or more consensus protocols across its nodes for both private blockchain network or a public blockchain network Another feature of this disclosure is that a vDLT network is based on a dynamic or static policy associated with the transaction or based on the information contained in a smart contract executed to complete the transaction or based on a DLT network or a DLT sub-network that the virtual DLT node and the other virtual DLT nodes are a member of.

Another feature of this disclosure is that a vDLT network can be used for recording data compliances use case, transacting trade finance use-case or a supply-chain use-case or a mobile number portability use-case or unsolicited customer communications use-case or issuance of a letter of credit or the sharing of a bill of lading or other documents for a trade finance use-case or advertisement transaction record use case.

Another feature of this disclosure is that a vDLT network can be in a cloud data center or an in-network data center or at an edge data center.

While considerable emphasis has been placed herein on certain embodiments, it will be appreciated that many embodiments can be made and that many changes can be made in the preferred embodiments without departing from the principles of the disclosure. These and other changes in the embodiments of the disclosure will be apparent to those skilled in the art from the disclosure herein, whereby it is to be distinctly understood that the foregoing descriptive matter to be implemented merely as illustrative of the disclosure and not as limitation.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A system for asynchronous delayed update in a virtual distributed ledger technology network, comprising:
    at least one hardware processor; and
    at least one memory device storing instructions executable by the at least one hardware processor to perform operations comprising:
        creating a first virtual machine or container associated with a master ledger;
        creating one or more additional virtual machines or containers, wherein each of the one or more additional virtual machines or containers is associated with a slave ledger;
        receiving, at the first virtual machine or container, a transaction request comprising transaction information;
        updating the master ledger with the transaction information;
        communicating, by the first virtual machine or container, with the one or more additional virtual machines or containers, an update from the master ledger to the slave ledgers at one or more times determined based on a delay tolerance associated with each of the one or more additional virtual machines or containers, wherein the communicating comprises:
            aggregating a number of transactions; and
            transmitting, to the one or more additional virtual machines or containers, a bulk update comprising the number of transactions based on an aggregation delay allowance, the aggregation delay allowance being determined based on the delay tolerance and an inter-node latency; and updating the one or more additional virtual machines or containers based on the communicated update of the master ledger.

2. The system of claim 1, wherein the first virtual machine or container is a master producer node associated with a virtual distributed ledger technology network and the one or more additional virtual machines or containers are one or more slave consumer nodes associated with the virtual distributed ledger technology network, each of the one or more slave consumer nodes storing at least partially replicated ledger.

3. The system of claim 2, wherein the one or more times are different and the master producer node communicates the update of the master ledger with each of the one or more slave consumer nodes at a different time so that the one or more slave consumer nodes are asynchronously updated.

4. The system of claim 3, wherein the virtual distributed ledger technology network does not seek consensus from the one or more slave consumer nodes for asynchronous updates of the one or more slave consumer nodes.

5. The system of claim 4, wherein the virtual distributed ledger technology network comprises a complaint addressing ledger configured to resolve an issue related to the asynchronous updates of the one or more slave consumer nodes.

6. The system of claim 1, wherein the inter-node latency is determined based on periodic ping measurements of packet delays between a producer node and a consumer node associated with a virtual distributed ledger technology network.

7. A method for asynchronous delayed update in a virtual distributed ledger technology network, comprising:
creating, via at least one hardware processor, a first virtual machine or container associated with a master ledger;
creating, via the at least one hardware processor, one or more additional virtual machines or containers, wherein each of the one or more additional virtual machines or containers is associated with a slave ledger;
receiving, via the at least one hardware processor, at the first virtual machine, a transaction request comprising transaction information;
updating, via the at least one hardware processor, the master ledger with the transaction information;
communicating, via the at least one hardware processor, by the first virtual machine or container, with the one or more additional virtual machines or containers, an update from the master ledger to the slave ledgers at one or more times determined based on a delay tolerance associated with each of the one or more additional virtual machines or containers, wherein the communicating comprises:
aggregating, via the at least one hardware processor, a number of transactions; and
transmitting, via the at least one hardware processor, to the one or more additional virtual machines or containers, a bulk update comprising the number of transactions based on an aggregation delay allowance, the aggregation delay allowance being determined based on the delay tolerance and an inter-node latency; and
updating, via the at least one hardware processor, the one or more additional virtual machines or containers based on the communicated update of the master ledger.

8. The method of claim 7, wherein the first virtual machine or container is a master producer node associated with a virtual distributed ledger technology network and the one or more additional virtual machines or containers are one or more slave consumer nodes associated with the virtual distributed ledger technology network, each of the one or more slave consumer nodes storing at least partially replicated ledger.

9. The method of claim 8, wherein the one or more times are different and the master producer node communicates the update of the master ledger with each of the one or more slave consumer nodes at a different time so that the one or more slave consumer nodes are asynchronously updated.

10. The method of claim 9, wherein the virtual distributed ledger technology network does not seek consensus from the one or more slave consumer nodes for asynchronous updates of the one or more slave consumer nodes.

11. The method of claim 10, wherein the virtual distributed ledger technology network comprises a complaint addressing ledger configured to resolve an issue related to the asynchronous updates of the one or more slave consumer nodes.

12. The method of claim 7, wherein the inter-node latency is determined based on periodic ping measurements of packet delays between a producer node and a consumer node associated with a virtual distributed ledger technology network.

13. A non-transitory computer-readable medium storing instructions for asynchronous delayed update in a virtual distributed ledger technology network, the instructions executable by a hardware processor to perform operations comprising:
creating, via at least one hardware processor, a first virtual machine or container associated with a master ledger;
creating, via the at least one hardware processor, one or more additional virtual machines or containers, wherein each of the one or more additional virtual machines or containers is associated with a slave ledger;
receiving, via the at least one hardware processor, at the first virtual machine, a transaction request comprising transaction information;
updating, via the at least one hardware processor, the master ledger with the transaction information;
communicating, via the at least one hardware processor, by the first virtual machine or container, with the one or more additional virtual machines or containers, an update from the master ledger to the slave ledgers at one or more times determined based on a delay tolerance associated with each of the one or more additional virtual machines or containers, wherein the communicating comprises:
aggregating, via the at least one hardware processor, a number of transactions; and
transmitting, via the at least one hardware processor, to the one or more additional virtual machines or containers, a bulk update comprising the number of transactions based on an aggregation delay allowance, the aggregation delay allowance being determined based on the delay tolerance and an inter-node latency; and
updating, via the at least one hardware processor, the one or more additional virtual machines or containers based on the communicated update of the master ledger.

14. The medium of claim 13, wherein the first virtual machine or container is a master producer node associated with a virtual distributed ledger technology network and the one or more additional virtual machines or containers are one or more slave consumer nodes associated with the virtual distributed ledger technology network, each of the one or more slave consumer nodes storing at least partially replicated ledger.

15. The medium of claim 14, wherein the one or more times are different and the master producer node communicates the update of the master ledger with each of the one or more slave consumer nodes at a different time so that the one or more slave consumer nodes are asynchronously updated.

16. The medium of claim 15, wherein each additional virtual machine is a consuming node, wherein the virtual distributed ledger technology network does not seek consensus from the consumer nodes.

17. The medium of claim 13, wherein the inter-node latency is determined based on periodic ping measurements of packet delays between a producer node and a consumer node associated with a virtual distributed ledger technology network.

* * * * *